(12) United States Patent
Sherman et al.

(10) Patent No.: US 8,423,449 B2
(45) Date of Patent: Apr. 16, 2013

(54) CONSOLIDATED SALES, MARKETING, AND CUSTOMER SUPPORT SYSTEM FOR FINANCIAL PRODUCTS

(75) Inventors: A. Haag Sherman, Houston, TX (US); David J. Clifford, Houston, TX (US)

(73) Assignee: Salient Partners, L.P., Houston, TX (US)

( * ) Notice: Subject to any disclaimer, the term of this patent is extended or adjusted under 35 U.S.C. 154(b) by 0 days.

(21) Appl. No.: 12/920,189

(22) PCT Filed: Jun. 19, 2009

(86) PCT No.: PCT/US2009/047982
§ 371 (c)(1),
(2), (4) Date: Aug. 30, 2010

(87) PCT Pub. No.: WO2009/155532
PCT Pub. Date: Dec. 23, 2009

(65) Prior Publication Data
US 2011/0078066 A1    Mar. 31, 2011

Related U.S. Application Data

(60) Provisional application No. 61/074,457, filed on Jun. 20, 2008.

(51) Int. Cl.
*G06Q 40/00* (2012.01)
(52) U.S. Cl.
USPC ............. 705/37; 705/35; 705/36; 705/38; 705/322; 726/1; 707/723; 715/221

(58) Field of Classification Search .............. 705/35, 705/36, 38, 322; 726/1; 707/723; 715/221
See application file for complete search history.

(56) References Cited

U.S. PATENT DOCUMENTS

| | | | |
|---|---|---|---|
| 6,360,246 B1 * | 3/2002 | Begley et al. | 709/203 |
| 2001/0042037 A1 * | 11/2001 | Kam et al. | 705/36 |
| 2002/0019791 A1 * | 2/2002 | Goss et al. | 705/36 |
| 2002/0147671 A1 * | 10/2002 | Sloan et al. | 705/36 |
| 2003/0225660 A1 * | 12/2003 | Noser et al. | 705/36 |
| 2005/0240456 A1 * | 10/2005 | Ward et al. | 705/7 |
| 2006/0282380 A1 * | 12/2006 | Birney et al. | 705/42 |
| 2007/0208645 A1 * | 9/2007 | Hoffman et al. | 705/36 R |

FOREIGN PATENT DOCUMENTS

| KR | 1020010000370 A | 1/2001 |
|---|---|---|
| KR | 1020010066979 A | 12/2001 |

OTHER PUBLICATIONS

International Search Report and Written Opinion dated Feb. 4, 2010 for International Application No. PCT/US2009/047982, 11 pages.

\* cited by examiner

*Primary Examiner* — Tien Nguyen
(74) *Attorney, Agent, or Firm* — Chamberlain Hrdlicka

(57) ABSTRACT

A method includes accepting financial product information through a provider computer; accepting advisor information and client information; allowing access to a portion of the financial product information, based on the client information, through a client computer; allowing access to another portion of the financial product information not accessible through the client computer, based on the advisor information, through an advisor computer; and tracking and reporting the advisor information and the client information through metrics.

20 Claims, 4 Drawing Sheets

CONSOLIDATED SALES, MARKETING, AND CUSTOMER SUPPORT SYSTEM FOR FINANCIAL PRODUCTS

BACKGROUND

Financial products traditionally have been marketed by providers through the use of financial advisors as agents. As such, the product providers rely upon the agents to perform a host of essential tasks to sell their products. For example, the agents typically identify prospective clients and determine which of the various financial products are appropriate for that client. Before recommending a product however, an agent may spend considerable time investigating the product. Some questions that may be investigated by an agent are: What criteria exist to qualify as an investor? What asset class (es) are involved? What are the potential tax consequences? If a fund, who are the advisors and what investment styles influence decisions? What is the performance history of the product? Where does it fit within a client's portfolio?

Considering these and many other factors that should be investigated by the agent as well as the provider, the volume of transactions that can be undertaken by a given agent is relatively limited.

BRIEF DESCRIPTION OF THE DRAWINGS

In order to address the above concerns, consolidated systems for financial products are disclosed. Reference is now made to the accompanying drawings and detailed description, wherein like reference numerals represent like parts.

NOTATION AND NOMENCLATURE

Figure 1:
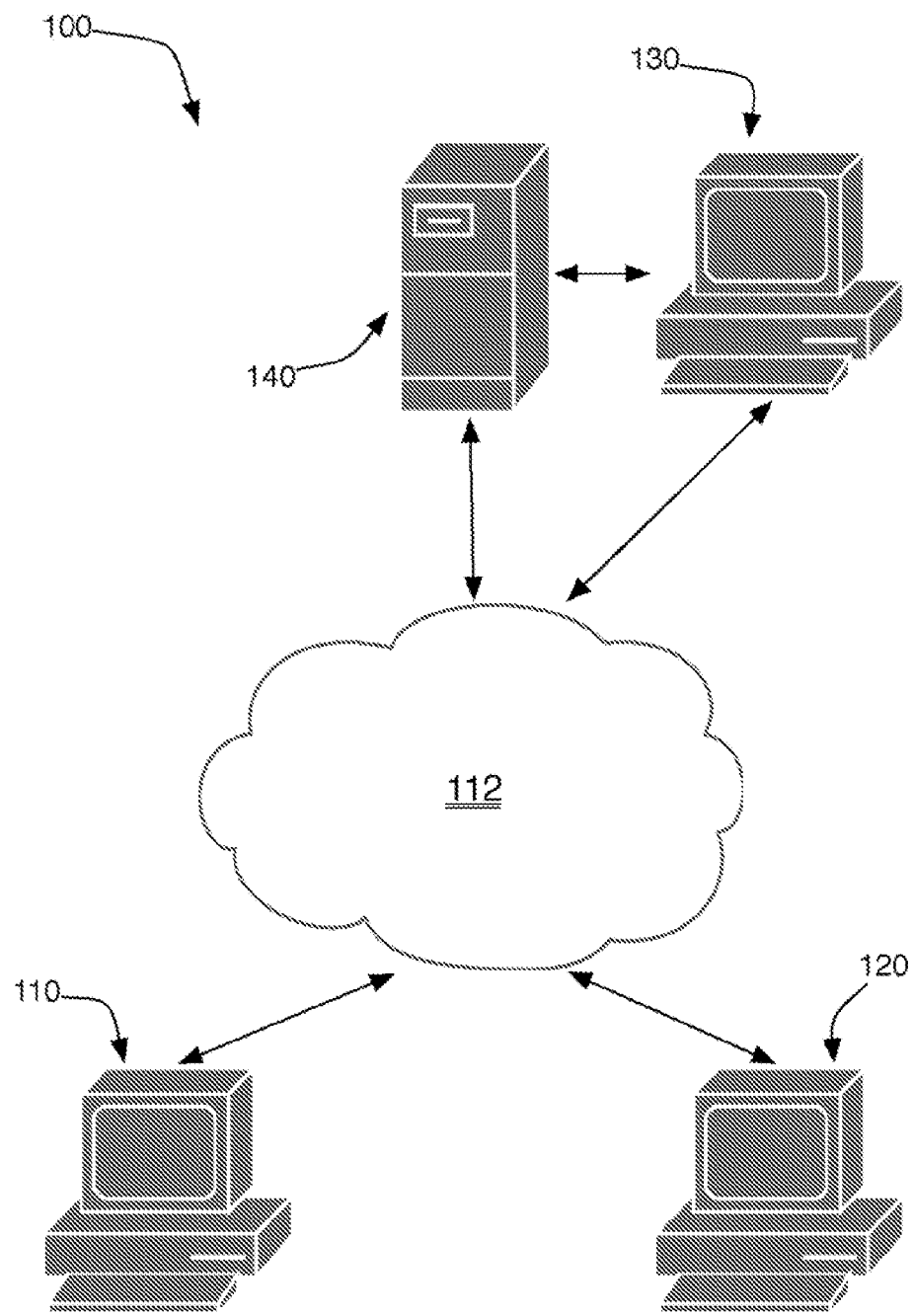
FIG. 1 shows a consolidated sales and marketing support system in accordance with at least some illustrative embodiments.

Certain terms are used throughout the following claims and description to refer to particular components. As one skilled in the art will appreciate, different entities may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean an optical, wireless, indirect or direct electrical connection, or other type of direct or indirect connection. Thus, if a first device couples to a second device, that connection may be through a direct electrical connection, through an indirect electrical connection via other devices and connections, through an optical connection, or through a wireless connection. Additionally, the term "system" refers to a collection of two or more hardware components, and may be used to refer to an electronic device.

DETAILED DESCRIPTION

The following discussion is directed to various embodiments related to the transactions of financial products such as stocks, bonds, equity funds, etc.; and alternative investment funds such as hedge funds, private equity funds, etc. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims, is limited to that embodiment.

Marketing financial products requires significant amounts of the agent's time and attention because the variety of financial products for any given need may be substantial. Moreover, the market for a product, in terms of potential client numbers, may be in the millions per year. Additionally, each client has particularized circumstances and needs, and these circumstances and needs typically vary over time. Although providers may provide written marketing materials, providers are typically limited in the extent to which they personalize the communications. At best, there may be a form presentation letter that merely lists the client information at the top of the letter, lists a product or products, and provides a brief non-individualized description or explanation of the product. The extent to which the provider communications take into account the particular circumstances and needs of the individual prospective client are extremely limited.

The providers also struggle to analyze and provide marketing and sales support to ensure the products are broadcast to the appropriate advisors and clients. Advisors need appropriate information on the financial products and providers must prepare materials as well as be available to answer questions and provide guidance to convince and prepare advisors to sell the product. The providers also struggle to support the advisors in their on-going sales efforts. Some questions providers consider are: What access to information should be given directly to the client and at what cost to the provider? What sales efforts by the advisor should be supported by the provider? What information should be tracked to be able to provide support to more productive advisors?

Marketing and sales support programs are therefore limited in their ability to process large volumes of agent, provider, and client communications. This is attributable in large part to the requirement for human input and decision making as a necessary function.

FIG. 1 shows an example system 100 for consolidated sales, marketing, and customer support. An advisor workstation 110 is operated by an advisor. The advisor is a financial advisor, agent, or the like. The advisor workstation 110 is configured for accessing information found on the system 100. Further, the advisor workstation 110 is configured such that the financial advisor may upload, download, copy, input, alter, or otherwise interact with the information found on the system 100.

The advisor workstation 110 couples to a server 140 via a communications network 112. The network 112 comprises any network of computers, or computer processors, arranged to share information. In certain instances, the network 112 may have certain usage, access, security, and maintenance controls for the advisor. The network 112 comprises any size, scale, scope, or purpose network. The network 112 may comprise a local area network (LAN) or a virtual private network (VPN), without limitation. Further, the network 112, as illustrated, may comprise multiple networks, for instance a series of networks. In one instance, the network 112 comprises the internet.

A client workstation 120 is operated by a potential or existing client of the advisor to access information on and interact with the system 100. The client workstation 120 likewise couples to the sever 140 via a communications network 112. Without limitation, the client workstation may be configured to access a different network 112 or a different series of networks to interact with system 100. The client workstation 120 may be shielded, or configured to limit the client access to certain networks, such that while the client is capable of accessing the network(s), they are not necessarily the same communications network(s) used by the advisor.

A provider workstation 130 is operated by the provider to load information into, access information on, and interact with the system 100. The provider workstation 130 likewise couples to the sever 140 via a communications network 112. The provider workstation 130 may be configured to access a different network 112 or a different series of networks to interact with system 100. The provider workstation 112 accesses network 112, although not necessarily the same communications network used by the advisor and/or client. Software executing on the advisor workstation 110, the client workstation 120, the provider workstation 130, and the server 140 operate together to process, analyze, and transform the information on the system 100.

In the illustrative embodiment shown in FIG. 1, although the workstations 110, 120, and 130 and the server 140 are shown coupled to each other through a single network 112, separate networks may be used to transfer information for sales, marketing, and customer support. Additionally, other non-networked media such as floppy disks and optical discs may be used to transfer, analyze, and transform information. Other media for communicating information and financial data between elements of system 100 will become apparent to those of ordinary skill in the art, and all such media are intended to be within the scope of the present disclosure.

Figure 2A:
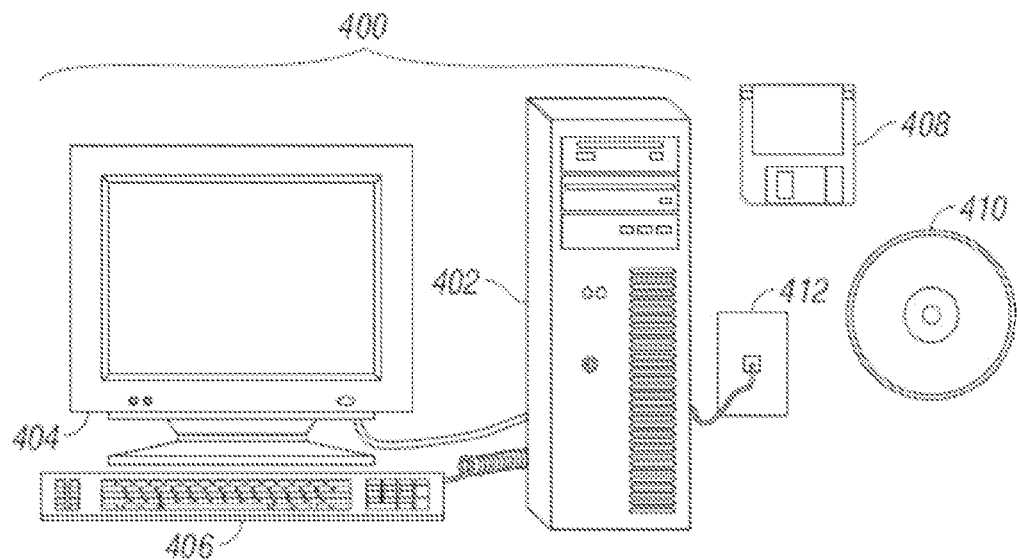
FIG. 2A shows an example of a computer suitable for use as a client workstation or a server in accordance with at least some illustrative embodiments.
Figure 2B:
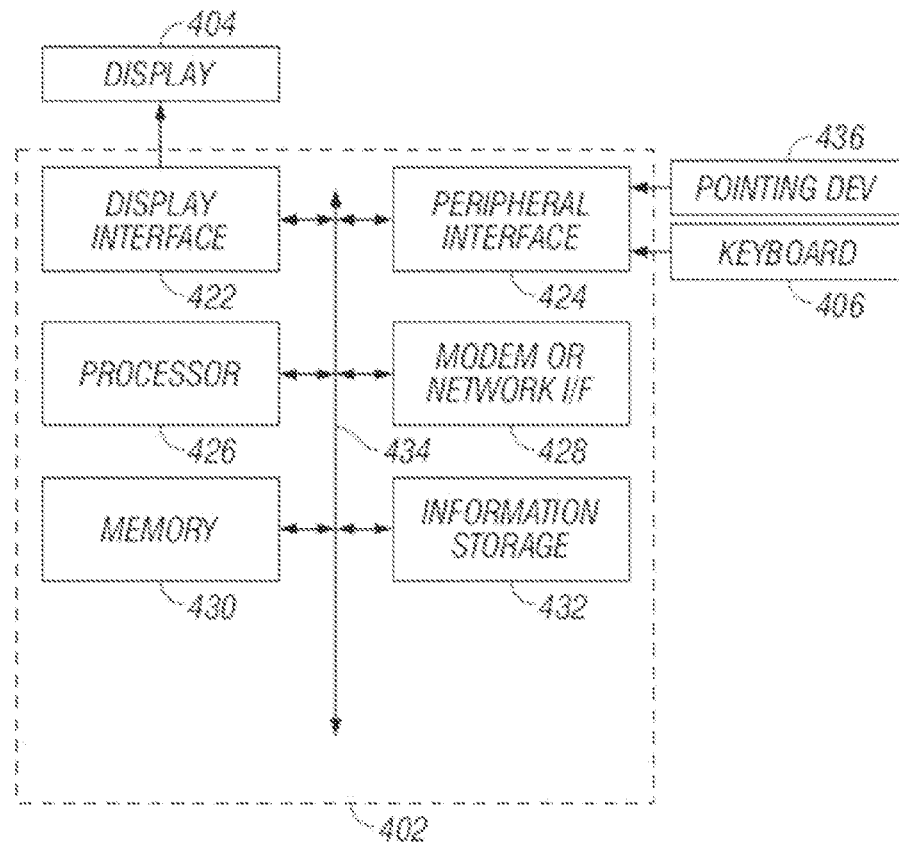
FIG. 2B shows a block diagram of the computer of FIG. 2A in accordance with at least some illustrative embodiments.

FIGS. 2A and 2B show an illustrative system configuration 400 suitable for implementing as the workstations 110, 120, and 130 and/or the server 140 of FIG. 1. As shown, the illustrative system configuration 400 includes a chassis 402, a display 404, and an input device 406. The chassis 402 includes a processor 426, memory 430, and information storage device 432. One or more information storage devices 432 may store programs and data on removable storage media such as a floppy disk 408, an optical disc 410 or a solid state memory device, such as a flash memory data storage device. The chassis 402 also includes a network interface 428 that allows the system 400 to receive information via a local area network (e.g., Internet 112 of FIG. 1) and/or a wired or wireless wide area network, represented in FIG. 2A by a phone jack 412. The information storage media and information transport media (i.e., the networks) are collectively called "information carrier media." The chassis 402 is coupled to the display 404 and the input device 406 to interact with the user. The display 404 and the input device 406 may together operate as a user interface. The input device 406 is shown as a keyboard, but other input devices such as a mouse, touch pad, or a keypad may also be included.

FIG. 2B shows a simplified functional block diagram of system 400. The chassis 402 may include a display interface 422, a peripheral interface 424, a processor 426, a modem or other suitable network interface 428, a memory 430, an information storage device 432, and a bus 434. System 400 may be a bus-based computer, with the bus 434 interconnecting the other elements and carrying communications between them. The display interface 422 may take the form of a video card or other suitable display interface that accepts information from the bus 434 and transforms it into a form suitable for the display 404. Conversely, the peripheral interface 424 may accept signals from the keyboard 406 and other input devices such as a pointing device 436, and transform them into a form suitable for communication on the bus 434.

The processor 426 gathers information from other system elements, including input data from the peripheral interface 424, and program instructions and other data from the memory 430, the information storage device 432, or from other systems coupled to a local area network and/or a wide area network via the network interface 428. The processor 426 carries out the program instructions and processes the data accordingly. The program instructions may further configure the processor 426 to send data to other system elements, including financial product information, which may be communicated via the display interface 422 and the display 404 of the workstations 110, 120, and 130 and/or the server 140 of FIG. 1. The network interface 428 enables the processor 426 to communicate with other systems via a local area network (LAN), a wide area network (WAN), and/or the internet. The memory 430 may serve as a low-latency temporary store of information for the processor 426, and the information storage device 432 may serve as a long term (but higher latency) store of information. In certain instances, the information storage device 432 may be a device configured to add, remove, modify, or transform data on removable storage media without limitation.

The processor 426, and hence the computer 400 as a whole, operates in accordance with one or more programs stored on the information storage device 432 or received via the network interface 428. The processor 426 may copy portions of the programs into the memory 430 for faster access, and may switch between programs or carry out additional programs in response to advisor actuation of the input device. The additional programs may be retrieved from the storage device 432 or may be retrieved or received from other locations via the network interface 428. One or more of these programs executes on system 400 causing it to perform at least some of the processing functions disclosed herein.

Figure 3:
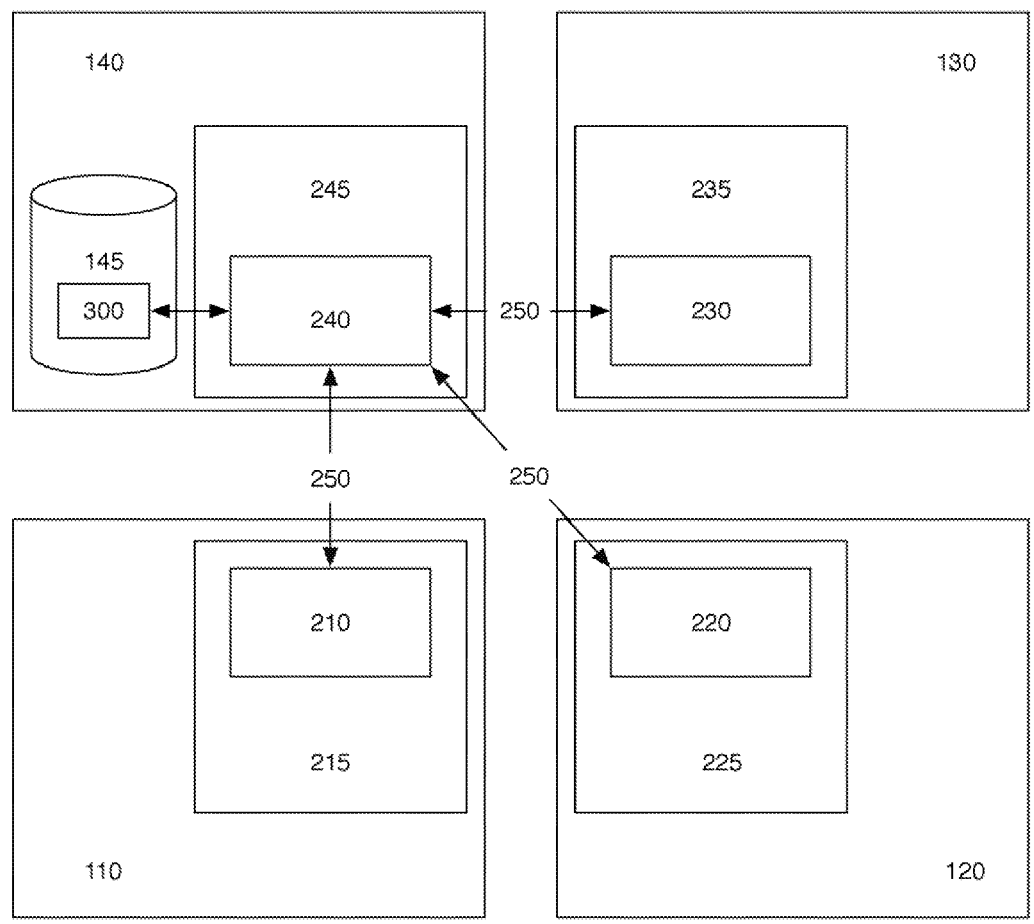
FIG. 3 shows a client-server configuration in accordance with at least some illustrative embodiments.

As shown in the illustrative embodiment of FIG. 3, advisor application software 210, client application software 220, provider application software 230, and server application software 240 (executing on the workstations 110, 120, and 130 and server 140 respectively) interact as sales, marketing, and customer support processing software 250. The functionality of the software 250 may be distributed between the advisor/client/provider and server components in a number of different ways. In at least some illustrative embodiments, most of the processing is concentrated in the server application software 240, resulting in a "thin" client implementation of the advisor application software 210, the client application software 220, or the provider application software 230, which provide the user interface. Such a thin client may be implemented as a web-based client using the hypertext markup language ("HTML"), Java, or other similar browser-based software. The advisor application software 210, the client application software 220, and the provider application software 230 execute within the environment provided by web browser software 215, 225, and 235 (e.g., Apple Safari, Mozilla Firefox, or Microsoft Internet Explorer), which executes on the workstations 110, 120, and 130 respectively. The application software 210, 220, and/or 230 communicates and interacts with the server application software 240, which executes within the environment created by web server software 245 (e.g., Apache web server software), which in turn executes on the server 140.

By using a thin, web-based client and implementing the data processing functions on the server, application specific software does not need to be expressly installed onto the workstations 110, 120, or 130. Rather, only a portion of application specific software may be installed on workstations 110, 120, and 130. For example, an advisor, client, and/or provider can simply execute web browser software 215, 225, or 235 on a workstation. The web browser will access server application software 240 by executing application software 210, 220, and/or 230 within the web browser.

The provider application software 230 may provide the user interface that allows the provider to input information for creation of a data file and upload the data file to the server 140. The data file contains information about an advisor and/or client, for the provider's reference, usage, analysis, or transformation. Preferably, the server 140 stores advisor and client information in a database 300 on a storage device 145. In at least some illustrative embodiments, the data file may be created at the provider workstation 130 using the provider application software 230 using any suitable upload data format. For example, the upload data format may include a file format such as the Adobe portable document format ("PDF"). Some of the upload data formats, such as the PDF upload data format, do not permit individual elements of the advisor/client information to be reformatted. Other upload data formats permit manipulation and reformatting of individual elements of the advisor/client information. Those skilled in the art will recognize that many other data and file formats may be suitable for describing advisor/client information, and all such data and file formats are intended to be within the scope of the present disclosure.

Figure 4:
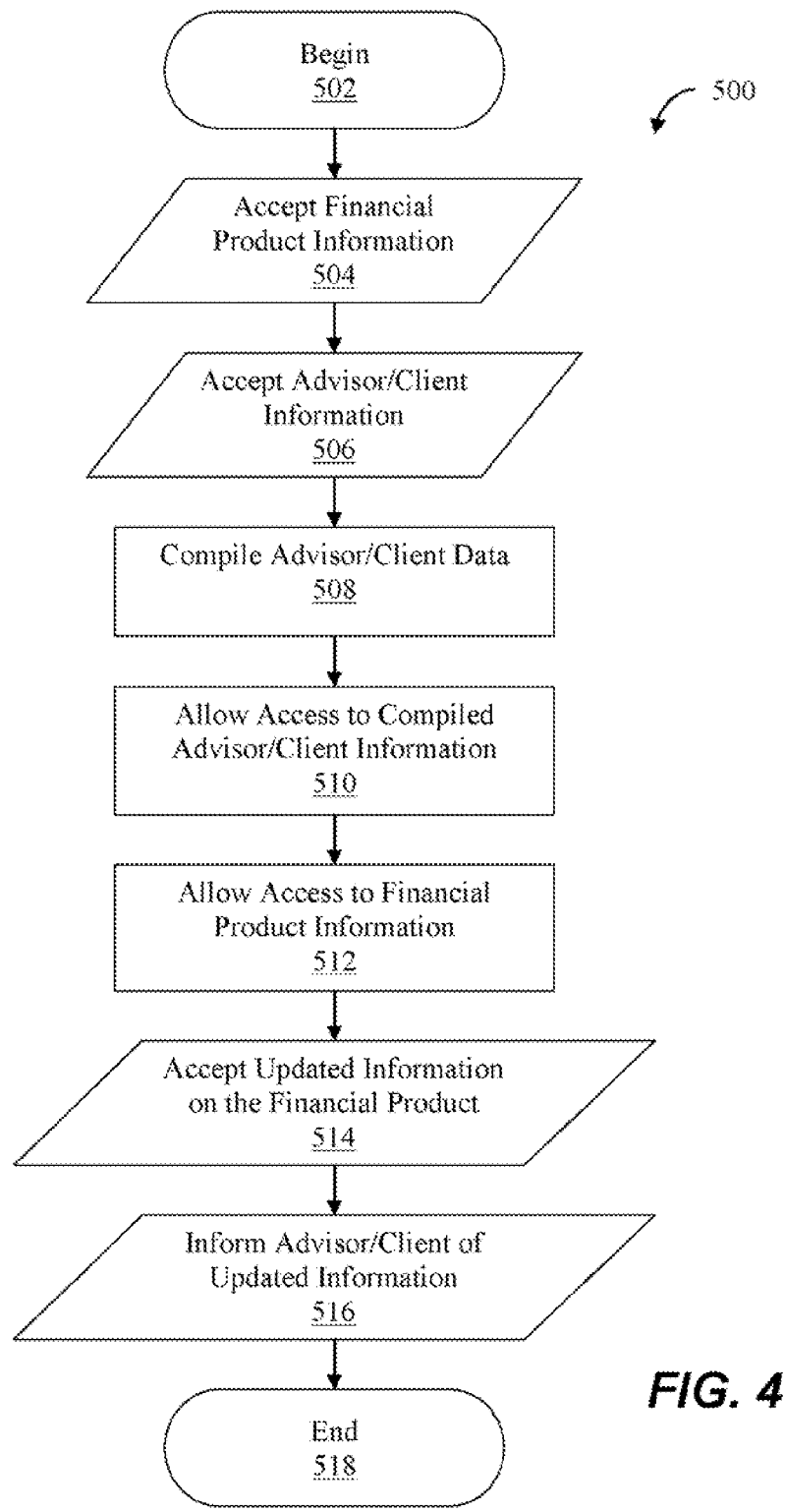
FIG. 4 shows a method of implementing a consolidated sales and marketing support system in accordance with at least some illustrative embodiments.

FIG. 4 is a flow chart depicting a method 500 of consolidation beginning at 502 and ending at 518. Financial product information is accepted at 504. For example, the provider uploads information on the financial product using the provider workstation 130. Initial contact with the provider will include interaction between the advisor or client and the provider's personnel that uses the software 250 to track sales, call volume, inquiries, and ongoing sales. At 506, advisor or client information from incoming communications, outbound communications, sales, and the like is accepted. Preferably, the information is input into the system 100 by provider personnel over network 112 to server 140 at 504 as discussed above in FIGS. 1-3. In at least one embodiment, the following advisor and/or client information is submitted to the database 300:

Data on Financial Advisors/Clients. The advisor/client data is compiled at 508. Each client who inquires about a product will have a data file for the system 100. Each advisor who is solicited to sell a product will have a data file for the system 100. In certain instances, the data file comprises a client or an advisor profile. The data file will comprise the client's or advisor's contact, financial, and personal information. For advisors, the data file will also include the name, branch, address, email address, department, or supervisor of the advisor. Further, the data including personal information comprises:

1. Name;
2. Telephone Number;
3. Email Address;
4. Asset amount under management by product;
5. Communication preferences;
6. Kit order information;
7. Performance by account (since inception);
8. Birthday;
9. Spouse's name;
10. Children's names;
11. Misc.

Further, there will be fields in the data entry user interface for personal details on each advisor or client. The personal data—e.g., birthday—will be used to track the advisor or client and personalize service or offer customer service rewards. For example, the system 100 tracks the transactions linked to the advisor or client and stores them as metrics in the data file. For a given number of transactions, financial amount in transactions, earned financial amount in transaction, or other metrics, the system 100 compares against a provider standard. If the metric meets provider criteria, the system 100 may inform the provider that a customer service reward is applicable. Further, system 100 records the customer service reward prompt. In certain instances, the metric measures whether advisor is productive or the client has purchased a certain amount of a product. A customer service reward may comprise a gift on the advisor or client's birthday. The advisor information may also be updated continuously to provide the best picture of the advisor's or client's current profile, transactions, and rewards as described further herein.

Inquiry/Response. The system 100 will track the financial advisors who sell a product to their clients. Additionally, system 100 will track the activity of the clients who purchase a product. In certain instances, the clients are advisor-originated clients; alternatively, the clients are provider-direct clients. The software 250 will be used to gather data, for addition to a data file, on each inquiry, response, or other outbound communication with the advisors or clients. The data incorporated into a data file may include without limitation, kit orders by advisor for their clients, questions asked by the advisor, seminars attended, or any other communication and/or request by the advisor. For clients, the data incorporated into a data file may include without limitation, kits ordered by the client, client inquiries, questions raised during the inquiries, seminars attended, or any other communication and/or request by the advisor.

The data incorporated into the data file comprises an Inquiry/Response input into the data file or profile of the client or advisor. Each advisor and/or client communication, or Inquiry/Response, may be logged in a data file associated with the particular advisor/client to include information such as the purpose of the communication and the party initiating the communication. In certain instances, the information will be logged as a customer interaction count or tally, with the system 100. Without limitation, a count or tally may be any alpha-numeric code, abbreviation, or the like. A count or tally may represent any action, transaction, or communication, without limitation. In addition to logging the incidence of the communication, information on the communication content may also be recorded as part of the Inquiry/Response communication. Communication content may comprise satisfaction level with the product, the purpose of the communication, such as performance, operational issues, communication issues, and the like without limitation. If the communication is a specific inquiry or request, and additional information is to be submitted by the provider, a reminder, tally, or count highlighting that additional follow-up is needed may also be recorded. Further, a dialog may be displayed at the provider workstation 130, for recording the unfulfilled request to be noted for future actions. The communications with/from the provider may be stored in the data file on the client. Further, the communications are compiled regularly, and modified to suggest the provider response form, format, or content. As such an outbound communication may be tailored for the advisor/client to address the nature of the communication. For example, if the advisor/client was unhappy about the timing of a scheduled reporting, a remedy will be determined and then communicated to the client. The information and nature of the response is recorded as another data file for provider distribution; in certain cases the response is sent to other providers, or distributed broadly amongst providers.

The information contained in data files or profiles of the advisors and/or clients is compiled. In certain instances, a report may be generated at 510. The report contains the logged accesses to the system 100, and communications. The data files of the advisors and/or clients are compiled at a predetermined period. Further, system 100 may transform data, to produce output data, according to a user defined algorithm to track, analyze, compare, and rank the advisors and/or clients based on the logged communications. For example, the data files are compiled in order to distribute a weekly report; alternatively, a monthly report. The report is issued in regular periods and may be generated at 510. In certain instances, the report will have a list of all communications, inquiries, tallies, and the like, without limitation. The report may further include information such as with whom the communications were made (as they will have been logged into the system) and a list of any follow up items or customer service rewards. The report is generated such that it may be reviewed by the provider's personnel, such as a sales manager. Further, the analysis of the data and results of transformation by the algorithm may be supplied concurrently. The sales manager will be able to review the communication activity, the persons involved with the communication, notes made, and a reporting of unfulfilled requests, as well as the output data. The list of requests will carry over to future reports until noted that they have been filled, at which point they will drop off the unfulfilled list and populate the advisor's communications data file as such. The output data may be stored, for instance in database 300 on storage device 145.

Advisor Support.

The system 100 also includes support information for advisors. The support information is tailored to assist advisors. Support information may be organized into at least one advisor "workroom" where the advisor can access the information relating to the financial product at 512. The support information available may also be updated periodically as shown at 504. Alternatively, the support information is updated at the same or similar periods as the reports. Using a workstation such as advisor workstation 110, an advisor may access the information by logging into the system 100 using the application software 210. Each time an advisor logs on, a dialog will require the advisor to confirm that they are in fact the person/advisor that they purport to be. In certain instances, the advisor will have to confirm their identity prior to accessing the workstation or prior to accessing the "workroom." Once the advisor's identity has been confirmed, a subsequent or the next screen will verify that the advisor to agrees to terms and conditions of usage. In certain instances, those conditions comprise the agreement that the use of the information on the financial product is for internal use only. Additional terms may comprise agreements or conditions that the information contained in the advisor workroom is confidential and/or may not be shared with an unauthorized party. Additionally, certain information may have specific levels of confidentiality such that access to the information is restricted. For example, some sales support information may be accessible by an advisor with a certain ranking or accreditation determined by the provider, but another advisor may be restricted from accessing that information. Further, certain information the provider publishes for the advisor may be restricted from disclosure to a client. Additionally, the advisor support site includes information that enables the advisor to scale their business and provides the advisor with updates on the financial product on a regular basis. The information may comprise text, graphs, plots, analysis of the financial product and may also integrate visual and audio output communication that can be viewed by the advisor. For example, the advisor support materials may include the following:

General Information. Information on the provider and/or the financial product including video are included in the general information materials. In certain instances the general information is background information on the product. Additionally, the general information may provide or describe an overview of the performance of the product Description. A description of the provider and/or the financial product is included in the advisor support materials. The description includes a walk-through of the marketing materials and the financial product itself. In certain instances the description is updated periodically, e.g., in a period commensurate with updating the report.

Investment Themes; Asset Classes. The support information available for the advisors comprises discussion regarding the various investment themes and asset classes. The themes and classes are associated with a financial product with both audio and visual communication and supplemental materials. For example, each asset class may have a separate educational tutorial; alternatively the tutorial may comprise a lecture or be taught by a recognizable name in the investment industry. Further, each asset class may have an advisory board that oversees it. An advisory board comprising providers and/or advisors may be tasked with providing additional insight and credibility to the use of that asset class. The support information shall be updated periodically, e.g., in a period commensurate with updating the report.

What to Expect (Performance). The system 100 is configured to include an overview of the performance characteristics of the financial product. In certain instances, the performance overview characteristics are viewed from different periods, e.g., three months, six months, a year, five years, and beyond, if applicable. Alternatively, the performance overview characteristics are arranged for viewing in a period commensurate with a updating the report. Further, each asset class is displayed in a similar fashion. The performance overview information comprises an explanation of the portfolio construction, anticipated return, and volatility characteristics of the financial product without limitation. The performance information further comprises supplemental materials such as audio/visual presentations and documents. In certain instances, the system 100 is further configured such that the advisor has access to performance reports on the financial product, monthly updates on the financial product, comparisons to the financial markets in general, and updates on the financial markets in general. The performance reports are configured for display visually through video, audio presentations, and/or alternatively through graphical analysis.

Frequently Asked Questions (FAQs). The system 100 will also allow access to frequently-asked-questions (FAQs). Additionally, verbally presented inquiries may be input by the provider of the financial product. In certain instances, the system 100 may analyze inquiries in order to suggest or produce additional FAQs. The FAQs include, for example, tax questions, compliance questions, portfolio questions, or the like without limitation.

Advisor/Client Calls. The system 100 is further configured such that the provider is capable of hosting a periodic advisor and client call during access to the workstation 130. The call may be audiotaped, videotaped, or digitally recorded on the storage device 145. Recording the conversation permits the provider to respond to the advisor or client concerns. Further, the recording presents the provider with an opportunity to review the concerns and present views on a monthly topic of interest, e.g., the report. Additionally, the provider has an opportunity to address the concerns and provide analysis of the financial product's performance based on advisor and/or client feedback. The call itself may be information that the system 100 inputs into a data file for the financial product. The system 100, using a predetermined algorithm, may analyze the nature of the call to produce an output for the provider. For example, the call may generate an inquiry into how the financial product is positioned within products offered by the provider. The system 100 accesses the data file for the financial product, uses the data file from the call, and inputs both into the algorithm in order to output a provider action, suggestion, or the like without limitation. The call may comprise a summary of where the provider will be promoting the fund, targeted to certain advisors/clients, and may reference how to get information on the financial product.

Highlights. The system is configured such that an advisor at an advisor workstation has access to additional provider supplied information. For example, the advisor is able to access highlights, accentuated, preferred, or exception products. Additionally, the system 100 provides advisor with information regarding new financial products. In certain instances, the information may comprise promotions, advertisements, suggestions, or direct references to additional financial products offered by the provider as well as recently notable financial products entering the market.

Portfolio Positioning.

The system 100 may also include information on how to position the financial product within a client's portfolio. Alternatively, the system 100 may analyze a given financial product and present an output to the advisor or provider about positioning the financial product within an advisor or client portfolio. Positioning information may include the following:

Portfolio Analytics (in balanced portfolio). The system 100 will allow advisor to have access to information on risk/reward data and/or the benefits of an allocation to the financial product in a balanced portfolio. The information will show what an allocation to a portfolio, e.g. a growth, balanced, and/or income portfolio, without limitation, will provide the advisor's client from a risk/reward standpoint.

Core Allocation/Core Alternatives Allocation. This information outlines where the financial product differentiates itself from others and where it should be used as a fit for a portfolio. System 100 is configured such that provider may input certain parameter's into a given financial product data file, such as cost, performance, risk, and return, without limitation. System 100 compares input into financial product data file to other available financial products. The comparison transforms the data in the data file to a recommendation for the advisor regarding incorporation into a client portfolio. In certain instances, the recommendation is saved in a client data file or profile.

Other Alternatives to Use With the Financial Product. The alternatives comprise products on the advisor's platform, under the advisor's management, or under that of the firm employing the advisor. System 100, is configured to assess the alternatives and recommend the products that complement the financial product itself. In certain instances, the recommendations are stored as counts, tallies, or the like on the storage device 145. Further, the recommendations are capable of being recalled, analyzed, or transformed into financial quantities when implemented.

Due Diligence/Compliance/Accounting

Information on the operational, accounting and compliance aspects of the financial product will also be provided on system 100 and may include:

Initial Due Diligence. The system 100 comprises due diligence activities, assessments, and information saved in a diligence data file on the memory device 145. In certain instances, the diligence data file may provide an outline of the due diligence, valuation, and investment process. Additionally, the due diligence data file comprises a recommendation on the financial product.

Ongoing Due Diligence. Ongoing due diligence of the financial product may also be accessible on the system 100. In certain instances, the diligence data file may provide an outline of the ongoing due diligence, valuation, and investment process.

Tax Reporting. Tax reporting information may include timing of tax reporting, historical tax rates and information, a sample of the tax report, and a tutorial on how the information should be incorporated into a tax return. Tax reporting information may be stored in the data file for a selected financial product. In certain instances, the tax reporting information regarding a selected financial product is an input or factor in evaluating a financial product for an advisor or a client. The tax reporting data file may have certain implications for the client. Further, the tax reporting information maybe transformed into a recommendation, a count, a tally, or other system signal to alert the provider and/or advisor.

Operational Controls. Operational control information stored on storage device 145 may comprise information and recommendations regarding the operational controls for purchasing, implementing, or other transactions involving the financial product. Additionally, the operational control information comprises the compliance actions required, requested, or filed by the various regulatory frameworks covering the financial product, purchase thereof, and/or other transactions involving the financial product.

Library/Articles/Collateral Materials on Style of Investing

Articles on Fund. Recent publicly available articles, including opinions, analysis, and reviews on the investment style of the financial product are stored on storage device for advisor and client access. In certain instances, the articles may be transformed as counts or tallies within the financial product data file or profile. Without limitation, each article may be indexed with a brief description or abstract. The tally or count and abstract for the article will direct an advisor or client to the article. Additionally, the tally or count are incorporated into algorithms to transform the data file into a recommendation or report. As such storing the article will make improve advisor access to third party (outside client/advisor/provider) articles. The clips and articles may also include a prefatory comment to make it easier to navigate by the advisor.

Articles by/on Principals or CIO for the Financial Product. Articles comprising information on the personnel connected to the financial product are stored on storage device 145. The articles by or about the principals of the financial product, mainly the CIO of the fund, are stored and accessed in the same manner as the articles directly related to the financial product. Additionally, text, audio, and video files from the principal interviews in the media (the CIO), are stored and accessible. In certain instances, the articles may be transformed as counts or tallies within the financial product data file or profile. Without limitation, each article may indexed with a brief description, or abstract. The tally or count and abstract for the article direct an advisor or client to the article. Additionally, the tally or count are incorporated into algorithms to transform the data file into a recommendation or report. As such storing the article will make improve advisor access to third party (outside client/advisor/provider) articles.

The clips and articles may also include a prefatory comment to make it easier to navigate by the advisor.

Advisor Sales Support

Sales Assistance. The system 100 is configured to assist sales or act as sales support for the advisor. System 100 may include assistance in portions of the sales process, such as (1) conference calls; (2) client one-on-ones; and (3) client events/functions, without limitation. In certain instances, the system is accessible to assist an advisor in sales outside of the three parameters listed. The system comprising these three portions of a sale further comprise information on the service provided, the provider (including the geographic region of the provider), the supplemental materials accessed on system 100, as well as other information input into client data files or profiles. The system 100 comprises an analysis of overhead for a given sale, e.g., the business development expenditures made by the provider in obtaining the sale (e.g., costs for a client event), the gross financial investment to make an opportunity profitable, as determined by the advisor and the system 100. Additionally, compiling the data files from clients, advisor, provider, reports, and other, the system 100 suggests or estimates the return on equity and/or investment for a given sale or other transaction. The system 100 is further configured to calculate the rate of return, or return on investment for the opportunity needed by the advisor (e.g., size of investor total) to make additional transactions worthwhile. In certain instances, the system 100 comprises the testimonials by other advisors, stored in the financial product data file. Alternatively, the system 100 records the return on equity or profitability of a given financial product.

Forms. There may also be downloadable forms on the system 100 for each client interaction, including but not limited to one-on-one, seminars, interviews, presentations, and luncheons. The forms may include information on tasks that the advisor must fulfill, such as:

(a) investment required by the advisor;
(b) confirmation that NV equipment, etc. will be set up;
(c) invitations;
(d) lead time;
(d) proposed dates;
(e) advisor biographies and what they want to accentuate about their group sales pitch by the provider for the advisor; and
(f) any area of interest or topic they wants covered. Invitations, as described may further be stored on storage device.

Additionally, the system 100 is configured to suggest dates or schedules that coincide with other interviews, interactions, or visits, as stored in client, advisor, and provider data files, respectively. In certain instances, system 100 is configured to store a sale pitch, abstract, or signature describe the points an advisor or a provider are interested in highlighting or emphasizing about their financial product. These pitches are stored in client, advisor, and provider data files, respectively, such that system 100 may access them, and alert other users of the system 100 of their contents. Further, forms will be accumulated from several advisors on the system 100. System 100 may alert the provider of the form information; alternatively, suggest the provider schedule a trip an interaction or event within a particular geographic region. The system 100 recommendations are based on the processing of forms. For instance, a geographical region shows increased activity, the system 100 processes the received forms and compares to other stored information in client, advisor, and provider data files, respectively by using a provider-determined algorithm. The system 100 processes the information and notifies the provider or advisor of a potential opportunity, and recommends an event or personal interaction within that geographical region. Additional processes, and recommendations by the system 100 may be envisioned based on the system 100 comparative analysis of data, manipulation by provider determined algorithm, and transformation to a provider action. Further, the system 100 comprises publicized information regarding upcoming visits, seminars, events, and/or other personal interaction by the provider and/or an agent. In preparation for the event, the system 100 is configured output or send communications to logged advisors and/or clients at 516 in the geographical area directing them to additional information on the system 100. Information from the sales support or personal interaction events may also be included and accessible on the system 100. For example, the provider may host a conference call that may be transcribed and/or videotaped; alternatively the provider hosts a video conference. The materials from the conference communication are loaded into the database 300 and/or storage device 145. The system 100 stores, and/or catalogs the communications in a conference data file. The conference data files are configured to be accessible to advisors and/or clients through an index for sales support materials.

At 514, updated information on the financial product is accepted. At 516 the advisor/client is informed of updated information. For example, the system 100 may alert logged advisors/clients of updated sales support information with a communication such as, an email that includes links to the updated information on the system 100. Alternatively, a communication comprising a phone call, a fax, a text message, or internet message may be utilized to refer the client to system 100. Without limitation, the system 100 is configured to assist the provider, advisor, and clients in participating in events and meetings for the purpose of sales, investments, and/or other transactions surrounding the financial product.

Client Tracking

To the extent that a client wants access to the information stored in the system 100, the client will follow many of the same processes of the advisor. A kit is shipped to a client and the client is granted access to the system 100. The client data file is formed, and activities are logged into the database 300 and associated with the kit number, and client data file. The kit number should draw up a client name and client data file from the system 100. In certain instances, the client retains a login comprising his/her name as the username and the kit number as the password. In certain instances, the password may be changed in order to enhance security, improve client interface, improve client password retention, and/or permit electronic data signals to be used for the password, once the client has permissibly and/or permanently accessed and registered with system 100. If the client does not invest, purchase a financial product, or make further communications with provider and/or advisor, within a provider-selected period, for example 3 months, the password will expire. The expiration of a password indicates the system 100 will cease recognizing password or kit number as a valid entry and refuse access to system 100. If the client makes a recognized transaction within the provider-selected period, he/she will remain a valid, active, or recognized user of the system 100. In instances where a client or advisor redeems in full, ceases financial product purchasing, interactions, or other provider determined activity, the system 100 will cease to recognize the clients password as valid for access to the system. As such, the client will be denied access to the system 100.

As previously discussed, the database 300 is configured to track clients and advisors in the same manner. Further, system 100 may be configured such that clients are restricted from certain materials. The client, for example, will have access to the articles, marketing materials, library, monthly updates, etc. at 516. However, the client may be restricted from certain sales support materials, which the system 100 makes available only to advisors and providers. Further, to the extent that a client wants information on a periodic basis, he or she will have the ability to log on to the system 100 at 516, on demand or at an client determined time, in order to access the requested and/or available information.

An advisor and/or client may place an order for a kit, e.g., to make a subscription to a financial product. The kit order is logged onto the system 100 at 504 for the advisor and/or client. The system 100 triggers, reminds, or otherwise initiates a communication between provider, advisor, and/or client within a predetermined period after completion of the order. This communication is preferably within a few days of a kit order. Further, the nature, status, and specifics of the communication and the order are logged into the database 300. The kit order log is associated with the advisor or client who placed the kit order. Any information associated with the kit order may also be added to the data file or profile at 504. Information associated with a kit order comprises confirmation of a financial product purchase, feedback information regarding the purchase, such as the reason for the purchase, or in certain instances, the reason a purchase was declined. Alternatively, the information associated with a kit order may be logged as a count or tally. In certain instances, the information associated with a kit order is kept in the data file or profile, in the database 300, and/or in the storage device 145.

The system 100 is configured to run diagnostic analysis of data files or profiles at a predetermined period. In certain instances, the diagnostic analysis comprises a search for unfulfilled kit orders, new advisors/clients that have not completed a kit order, or the like without limitation. As previously discussed, the data files of the advisors and/or clients, including new advisors/clients, is compiled and analyzed at a predetermined period. A provider may establish any predetermined time period as they deem appropriate for tracking their business, advisors, and/or clients. Further, the system 100 may transform the data file, to produce output data, according to a user defined algorithm to track, analyze, compare, and rank the advisors and/or clients based on the logged communications. For example, the data files are compiled in order to distribute a weekly report; alternatively, a monthly report. The report is issued in regular periods and may be generated at 510. In certain instances, the report will have a list of all communications, inquiries, tallies, and the like, without limitation. The report may further include information such as, which advisors/clients have unfulfilled kit orders, with whom they were made as they will have been logged into the system, and a list of any follow up items to ensure the unfulfilled kit order is completed in a timely manner. The report may further comprise customer-service reward recommendations or suggested courses of action determined by an algorithm in system 100 acting on the data file or profile of an advisor and/or client with an unfulfilled kit order.

The reports as generated may include further analysis regarding advisor and/or client actions. For example, the analysis of the data files contained in the reports may be configured to allow the provider to track repurchases. Without limitation, a repurchase comprises at least a second transaction, whereby the advisor and/or client purchases a particular or similar product from the provider. In instances, the repurchase information by advisor/client is recorded by logging information into the database 300 at 504. The repurchase information would also be logged into the database 300, for example, as one of the following categories: (a) performance; (b) tax reporting; (c) portfolio re-balancing; (d) liquidity needs; or (e) other (specify). Alternatively, the repurchase information may be logged as a count or tally. Additional details may also be included in the log entry into the data file or profile for the repurchase. After the repurchase and logging of information in the appropriate data file or profile, the information may appear on the reports previously discussed. The report may further comprise customer service reward recommendations or suggested courses of action determined by a provider determined algorithm in system 100 acting on the data file or profile of an advisor and/or client with an a repurchase. Repurchases may be followed by a communication from the provider to understand why a repurchase was made.

The reports are outputs of system 100. A provider may determine a sequence or algorithm for analyzing, compiling, ranking, modifying, and producing a report. The report comprises a transformation of the advisor/client data files or profiles, into a financial opportunity report. In certain instances, the system 100 associates a financial value with the output of analyzed data regarding kit orders, unfulfilled kit orders, repurchase orders, and other transaction orders. Further, the report comprises a metered assessment of the providers product, sales, and financial situation. The report is saved on storage device 145 for future reference and/or analysis.

Metrics.

Advisor Metrics. Each advisor will have a data file or profile that includes or illustrates their performance to the provider in selected areas. For example, the data file or profile comprises:

1. Total kits ordered;
2. Orders fulfilled;
3. Conversion Ratio;
4. Average ticket size;
5. Recent activity;
6. Inquiries/Questions;
7. Notes and other questions
8. Requests for dinners, client events, etc.

These will be put together in graphical form, where applicable.

Regional Metrics. The same metrics will be compiled on a regional basis. In the instance of a regional metric, the data file of multiple advisors may be combined in such a way that they regional metric displays an average of advisor performance. Alternatively, the regional metric may be itemized, such that each advisor is directly compared to multiple advisors. These regional metrics comprise:

1. Total kits ordered;
2. Orders fulfilled;
3. Conversion Ratio;
4. Average ticket size;
5. Recent activity;
6. Inquiries/Questions;
7. Notes and other questions
8. Requests for dinners, client events, etc.

Overall Metrics. Overall metrics, for the provider company, business, branch, or sector are designed to be logged, analyzed, tracked and transformed into report, or financial amount in the same manner, and/or will include the same information as Regional Metrics.

Thus, system 100 is configured to grant advisors and clients with customized service, and the application, investment, and communication processes are consolidated and automated. As such, the advisors and clients receive better investment and financial product services and communication than typically offered by providers using non-consolidated systems. Other conditions and combinations of conditions will become apparent to those skilled in the art, including the combination of the conditions described above, and all such conditions and combinations are within the scope of the present disclosure. The above disclosure is meant to be illustrative of the principles and various embodiment of the present invention. Numerous variations and modifications will become apparent to those skilled in the art once the above disclosure is fully appreciated. It is intended that the following claims be interpreted to embrace all variations and modifications.

What is claimed is:

1. A system for consolidating and marketing of financial products, including:
   a server computer;
   a provider computer coupled to the server computer;
   an advisor computer coupled to the server computer;
   an investor computer coupled to the server computer; and
   instructions stored on the server computer that when executed on the server computer, perform a method including:
   accepting financial product, advisor, and investor information;
   allowing access to a portion of the financial product information, based on the investor information, directly with the server through the investor computer;
   allowing access to another portion of the financial product information not accessible through the investor computer, based on the advisor information, through the advisor computer; and
   tracking and reporting the advisor information and the investor information through metrics.

2. The system of claim 1, wherein the metrics include total orders, orders fulfilled, conversion ratio, and average order size.

3. The system of claim 1, wherein the portion of the financial product information accessed through the advisor computer includes advisor support information.

4. A machine-readable, non-transitory medium having computer-executable instructions, which when executed by a computer, cause the computer to perform a process for consolidating and marketing of financial products including:
   accepting financial product, advisor, and investor information;
   allowing access to a portion of the financial product information, based on the client information, directly with the server through an investor computer;
   allowing access to another portion of the financial product information not accessible through the investor computer, based on the advisor information, through an advisor computer; and
   tracking and reporting the advisor information and the investor information through metrics.

5. The medium of claim 4, wherein the metrics include total orders, orders fulfilled, conversion ratio, and average order size.

6. The medium of claim 4, wherein the second portion includes advisor support information.

7. The medium of claim 6, wherein advisor support information includes due diligence activities and assessments.

8. The medium of claim 4, the computer further compiling the advisor information or investor information into a data file.

9. The medium of claim 8, the computer further generating a report based on the data file.

10. The medium of claim 9, wherein the report includes a log of accesses to the financial product information.

11. The medium of claim 4, wherein the portion of the financial information accessed through the advisor computer includes alternative financial products to financial products in the portion accessed by the investor computer.

12. The medium of claim 4, the computer further hosting an audiovisual conference via the investor computer and advisor computer.

13. The medium of claim 4, the computer further accepting and filling orders for financial products.

14. The medium of claim 4, the computer further ranking a plurality of advisors or investors according to the metrics.

15. The medium of claim 14, the computer further recommending a course of action regarding a particular advisor or regarding a particular investor based on the ranking.

16. A method, including:
   accepting and storing financial product, advisor, and investor information;
   allowing direct access to a portion of the financial product information, based on the client information, through an investor computer;
   allowing access to another portion of the financial product information not accessible through the investor computer, based on the advisor information, through an advisor computer; and
   tracking and reporting the advisor information and the investor information through metrics.

17. The method of claim 16, wherein the metrics include total orders, orders fulfilled, conversion ratio, and average order size.

18. The method of claim 16, wherein a report generated from advisor information or investor information includes a log of accesses to the financial product information.

19. The method of claim 16, further including ranking a plurality of advisors or investors according to the metrics.

20. The method of claim 19, further including recommending a course of action regarding a particular advisor or regarding a particular investor based on the ranking.

* * * * *